(12) United States Patent
Menze et al.

(10) Patent No.: US 12,496,110 B2
(45) Date of Patent: Dec. 16, 2025

(54) LATERAL PROXIMAL TIBIA PLATE WITH EXTENSION ARM

(71) Applicant: DEPUY SYNTHES PRODUCTS, INC., Raynham, MA (US)

(72) Inventors: Johanna Menze, Zurich (CH); André Weber, Olten (CH); Martin Altmann, Zuchwil (CH)

(73) Assignee: DEPUY SYNTHES PRODUCTS, INC., Raynham, MA (US)

( * ) Notice: Subject to any disclaimer, the term of this patent is extended or adjusted under 35 U.S.C. 154(b) by 207 days.

(21) Appl. No.: 18/351,983

(22) Filed: Jul. 13, 2023

(65) Prior Publication Data

US 2025/0017635 A1 Jan. 16, 2025

(51) Int. Cl.
*A61B 17/80* (2006.01)
*A61B 17/17* (2006.01)
(Continued)

(52) U.S. Cl.
CPC ...... *A61B 17/8061* (2013.01); *A61B 17/8057* (2013.01); *A61B 17/809* (2013.01);
(Continued)

(58) Field of Classification Search
CPC . A61B 17/80; A61B 17/8061; A61B 17/8057; A61B 17/809; A61B 17/808; A61B 17/1728; A61B 17/8052; A61B 17/8085; A61B 17/1739; A61B 17/1764; A61B 17/28; A61B 17/29; A61B 17/2812; A61B 17/2816; A61B 17/282; A61B 17/2833; A61B 17/2841; A61B 2017/564
(Continued)

(56) References Cited

U.S. PATENT DOCUMENTS

| 8,257,405 | B2 | 9/2012 | Haidukewych |
| 10,335,210 | B2 | 7/2019 | Ricker |

(Continued)

FOREIGN PATENT DOCUMENTS

| CN | 205073003 U | * | 3/2016 | .......... A01M 1/2066 |
| CN | 107928774 A | | 4/2018 | |

(Continued)

OTHER PUBLICATIONS

Triantafyllos, Katsimentzas, et al. 'Surgical Approaches and Leg Positions for Tibial Plateau Fractures'. Tibia Pathology and Fractures, IntechOpen, Sep. 9, 2020. Crossref, doi:10.5772/intechopen.92126, ; last access on Apr. 3, 2025 (Year: 2020).*

(Continued)

*Primary Examiner* — Marcela I. Shirsat
(74) *Attorney, Agent, or Firm* — Kramer & Amado, P.C.

(57) ABSTRACT

A method for treating an articular fracture of a tibia using a tibia plate with an extension arm, including: making an incision to expose the tibia; reducing the articular fracture of the tibia; contouring the tibia plate to fit the tibia; preliminarily fixing the tibia plate to the tibia; placing a screw partially into the tibia through a lateral elongated hole in the tibia plate; applying compression between a plate screw hole in the extension arm and an anterior surface of the tibia; and placing additional plate screws in the tibia through additional screw holes in the tibia plate.

20 Claims, 8 Drawing Sheets

(51) Int. Cl.
  *A61B 17/28* (2006.01)
  *A61B 17/29* (2006.01)
  *A61B 17/56* (2006.01)

(52) U.S. Cl.
  CPC ....... *A61B 17/1728* (2013.01); *A61B 17/1739* (2013.01); *A61B 17/1764* (2013.01); *A61B 17/28* (2013.01); *A61B 17/2812* (2013.01); *A61B 17/2816* (2013.01); *A61B 17/282* (2013.01); *A61B 17/2833* (2013.01); *A61B 17/2841* (2013.01); *A61B 17/29* (2013.01); *A61B 2017/564* (2013.01); *A61B 17/808* (2013.01); *A61B 17/8085* (2013.01)

(58) Field of Classification Search
  USPC ....... 606/281, 280, 283, 284, 285, 286, 291, 606/86 R, 87, 88, 96, 99, 101, 86 B, 902, 606/915
  See application file for complete search history.

(56) References Cited

U.S. PATENT DOCUMENTS

| | | | | |
|---|---|---|---|---|
| 2006/0084997 | A1* | 4/2006 | Dejardin | A61B 17/921 606/62 |
| 2006/0149315 | A1* | 7/2006 | Kebel | B25B 7/16 606/205 |
| 2008/0300637 | A1* | 12/2008 | Austin | A61B 17/8057 606/290 |
| 2010/0152789 | A1* | 6/2010 | Dell'Oca | A61B 17/8866 606/324 |
| 2018/0092676 | A1* | 4/2018 | Ananthan | A61B 17/8085 |
| 2018/0256223 | A1* | 9/2018 | Lueth | A61B 17/809 |

FOREIGN PATENT DOCUMENTS

| | | |
|---|---|---|
| CN | 209122398 | 7/2019 |
| CN | 209220466 | 8/2019 |
| CN | 210095885 | 2/2020 |
| CN | 111973258 A | 11/2020 |
| CN | 113491568 A | 10/2021 |
| CN | 214966504 | 12/2021 |
| CN | 217408944 | 9/2022 |
| CN | 115645023 A | 1/2023 |
| TW | M493974 U | 1/2015 |
| WO | 2019079856 A1 | 5/2019 |

OTHER PUBLICATIONS

Anonymous: "Plate Holding Forceps—PN019—Platts & Nisbett," Jan. 1, 2019, pp. 1-2, hhttps://www.plattsnisbett.com/products/veterinary/orthopaedic-forceps/plate-holding-forceps-pn0199.
International Search Report and Written Opinion for corresponding International Application No. PCT/IB2024/056763 mailed on Oct. 28, 2024.
"Surgical Technique" LOQTEQ Proximal Tibia Plates 3.5, 2011.

\* cited by examiner

LATERAL PROXIMAL TIBIA PLATE WITH EXTENSION ARM

FIELD OF THE DISCLOSURE

Various exemplary embodiments disclosed herein relate to lateral proximal tibia plate with extension arm.

BACKGROUND

Tibia plates have been developed for addressing fractures in the tibia including fractures of the proximal tibia. Specifically, treatment of fractures in the posterolateral corner of the proximal tibia is challenging due to surrounding soft tissues such as arteries and nerves making it difficult to approach such fractures. A lateral proximal tibia plate may include a head and a body. The body may extend along the tibia and includes screw holes so that the tibia plate may be attached to the tibia. The head may include a row of screw holes at the end of the tibia plate. When screws are placed in these holes they may be used to capture, reduce, and secure fractured bone fragments.

SUMMARY

A summary of various exemplary embodiments is presented below.

Various embodiments relate to a tibia plate for treating an articular fracture of a tibia, including: a head with a plurality of screw holes and guide holes wherein the head is configured to extend along an articular rim of the tibia; a body attached to the head configured to extend along a length of the tibia, including: a plurality of screw holes; a plurality of guide holes; and a lateral elongated hole that is elongated along a width of the body; and an extension arm including a screw hole configured to extend along the articular rim of the tibia and to engage a posterior of the tibia.

Various embodiments relate to a wherein the body includes a longitudinal elongated hole that is elongated along a length of the body.

Further various embodiments relate to a tibia plate system for treating an articular fracture of a tibia, including: a tibia plate including: a head with a plurality of screw holes and guide holes wherein the head is configured to extend along an articular rim of the tibia; a body attached to the head configured to extend along a length of the tibia, including: a plurality of screw holes; a plurality of guide holes; and a lateral elongated hole that is elongated along a width of the body; an extension arm including a screw hole configured to extend along the articular rim of the tibia and to engage a posterior of the tibia; and a clamping tool configured to engage the screw hole in the extension arm and an anterior surface of the tibia including: first and second arm connected at a pivot point; a locking mechanism configured to lock the first and second arms in a specific position; ball interfaces at an end of the first and second arms configured to engage the screw hole in the extension arm; and tips that are sharp extending from the ball interfaces configured to engage the anterior surface of the tibia.

Various embodiments are described, wherein the body includes a longitudinal elongated hole that is elongated along a length of the body.

Further various embodiments relate to a method for treating an articular fracture of a tibia using a tibia plate with an extension arm, including: making an incision to expose the tibia; reducing the articular fracture of the tibia; preliminarily fixing the tibia plate to the tibia; placing a screw partially into the tibia through a lateral elongated hole in the tibia plate; applying compression between a plate screw hole in the extension arm and an anterior surface of the tibia; and placing additional plate screws in the tibia through additional screw holes in the tibia plate.

Various embodiments are described, further including: contouring the tibia plate to fit the tibia.

Various embodiments are described, wherein the incision is a lateral S incision.

Various embodiments are described, wherein the incision is an anterolateral incision using an anterolateral approach.

Various embodiments are described, further including: making another incision to open a posterolateral approach window; and placing an additional screw in a hole near an end of the extension arm.

Various embodiments are described, further including: performing an arthrotomy to expose a joint before reducing the articular fracture.

Various embodiments are described, further including applying one of an external fixator or distractor to facilitate reduction and visualization of a joint.

Various embodiments are described, provisionally fixing reduced bone fragment with a K-wire placed through guide holes in the tibia plate.

Various embodiments are described, further including determining a plate type of the tibia plate before contouring the tibia plate.

Various embodiments are described, wherein contouring the tibia plate to fit the tibia includes providing pre-loading to a posterolateral bone fragment.

Various embodiments are described, wherein preliminarily fixing the tibia plate includes inserting a plurality of K-wires though a plurality of guide holes in the tibia plate.

Various embodiments are described, further including confirming the preliminary fixation of the tibia plate using one of clinical examination and fluoroscopy.

Various embodiments are described, further including tightening the screw partially placed into the tibia through a lateral elongated hole in the tibia plate after applying compression.

Various embodiments are described, further including carrying out a clinical examination and fluoroscopy examination prior to placing additional plate screws in the tibia to confirm that: the tibia plate is orientated properly on a tibial plateau; plate trajectories in proximal plate screw holes are parallel to a joint in a transverse plane; and an alignment of the tibia plate to a shaft of the tibia is correct in both anterior-posterior and lateral views.

Various embodiments are described, wherein the tibia plate includes: a head with a plurality of screw holes and guide holes wherein the head is configured to extend along an articular rim of the tibia; a body attached to the head configured to extend along a length of the tibia, including: a plurality of screw holes; a plurality of guide holes; and the lateral elongated hole that is elongated along a width of the body; and the extension arm including a screw hole configured to extend along the articular rim of the tibia and to engage a posterior of the tibia.

Various embodiments are described, wherein applying compression between a plate screw hole in the extension arm and an anterior surface of the tibia is carried by using a clamping tool.

Various embodiments are described, wherein the clamping tool configured to configured to engage the plate screw hole in the extension arm and an anterior surface of the tibia, includes: first and second arm connected at a pivot point; a locking mechanism configured to lock the first and second arms in a specific position; ball interfaces at an end of the first and second arms configured to engage the screw hole in the extension arm; and tips that are sharp extending from the ball interfaces configured to engage the anterior surface of the tibia.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1A:
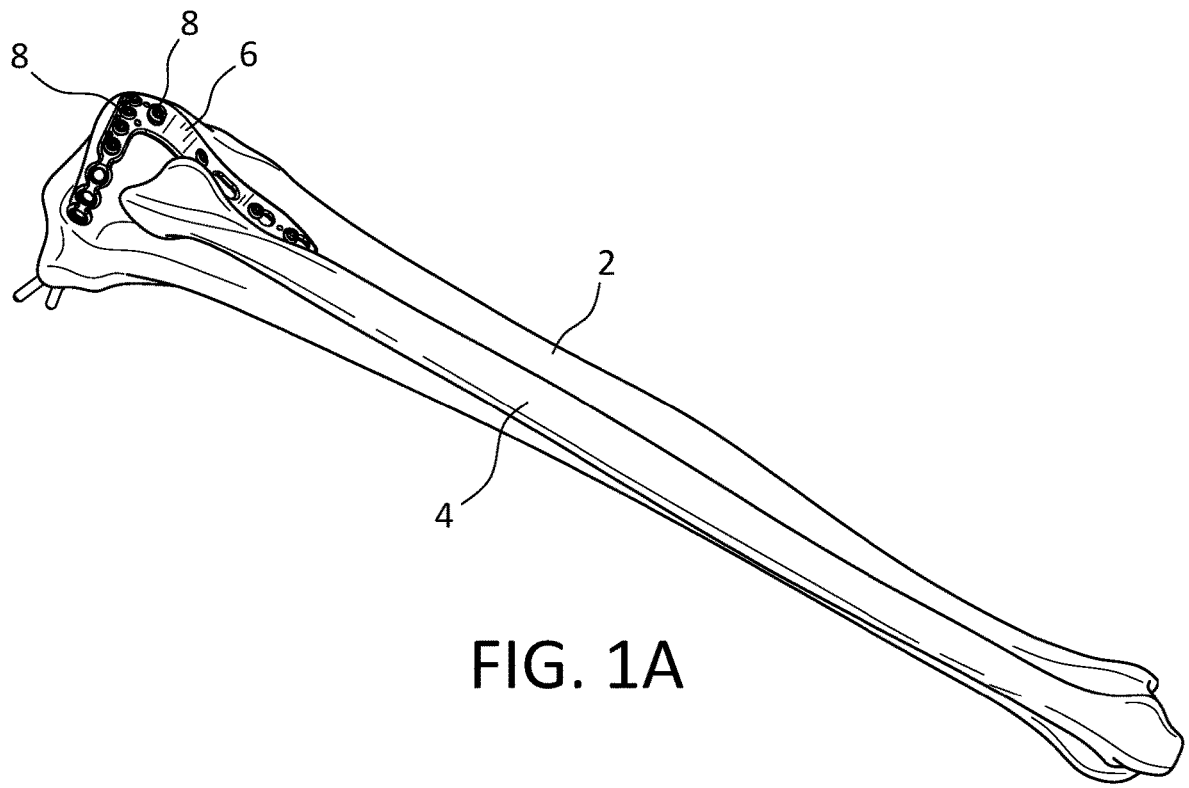
FIGS. 1A-D illustrate perspective, close-up perspective, top, and side views of a tibia plate on the tibia.
Figure 1B:
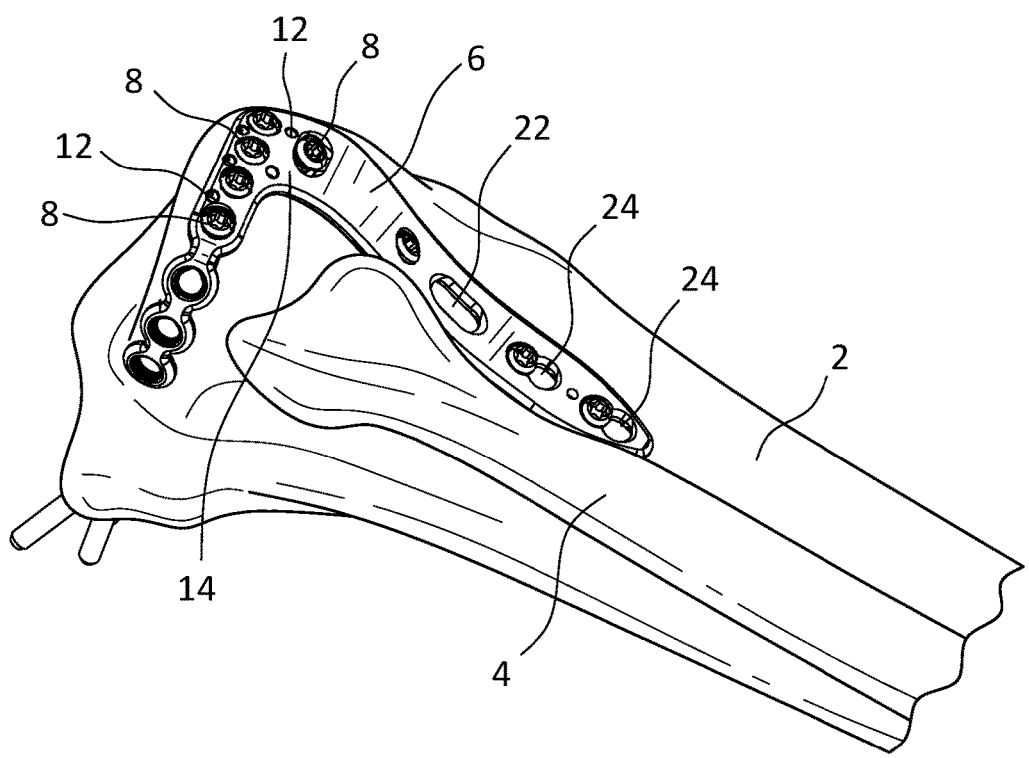
Figure 1C:
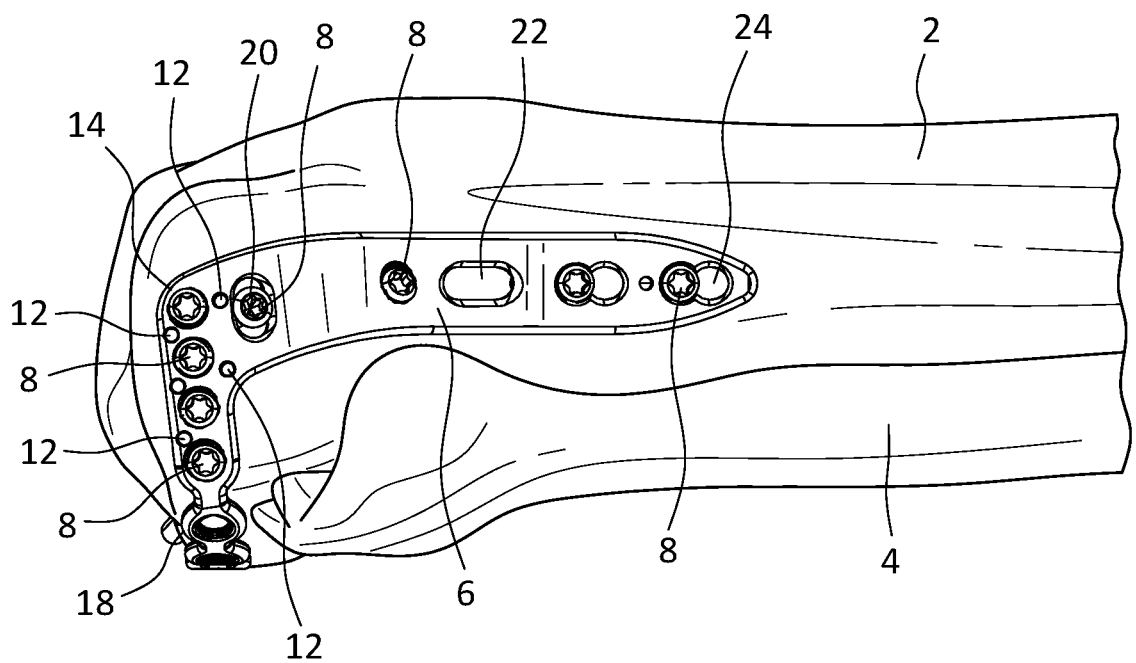
Figure 1D:
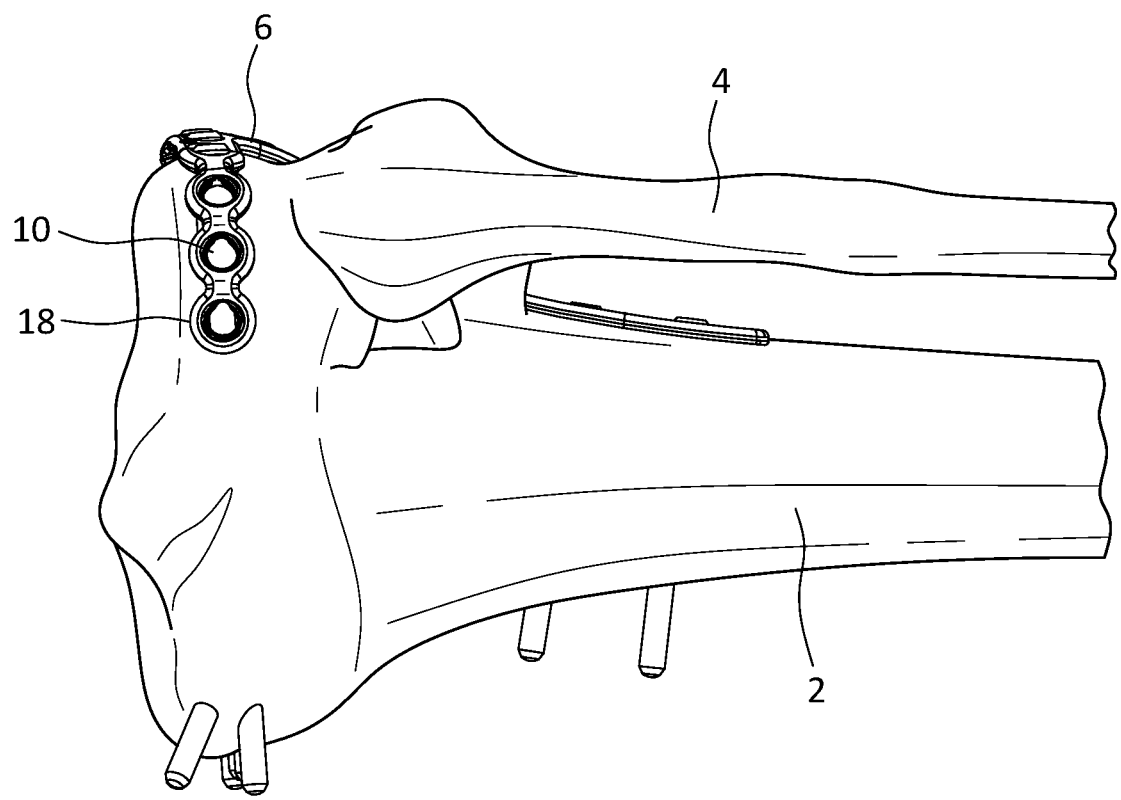
Figure 2A:
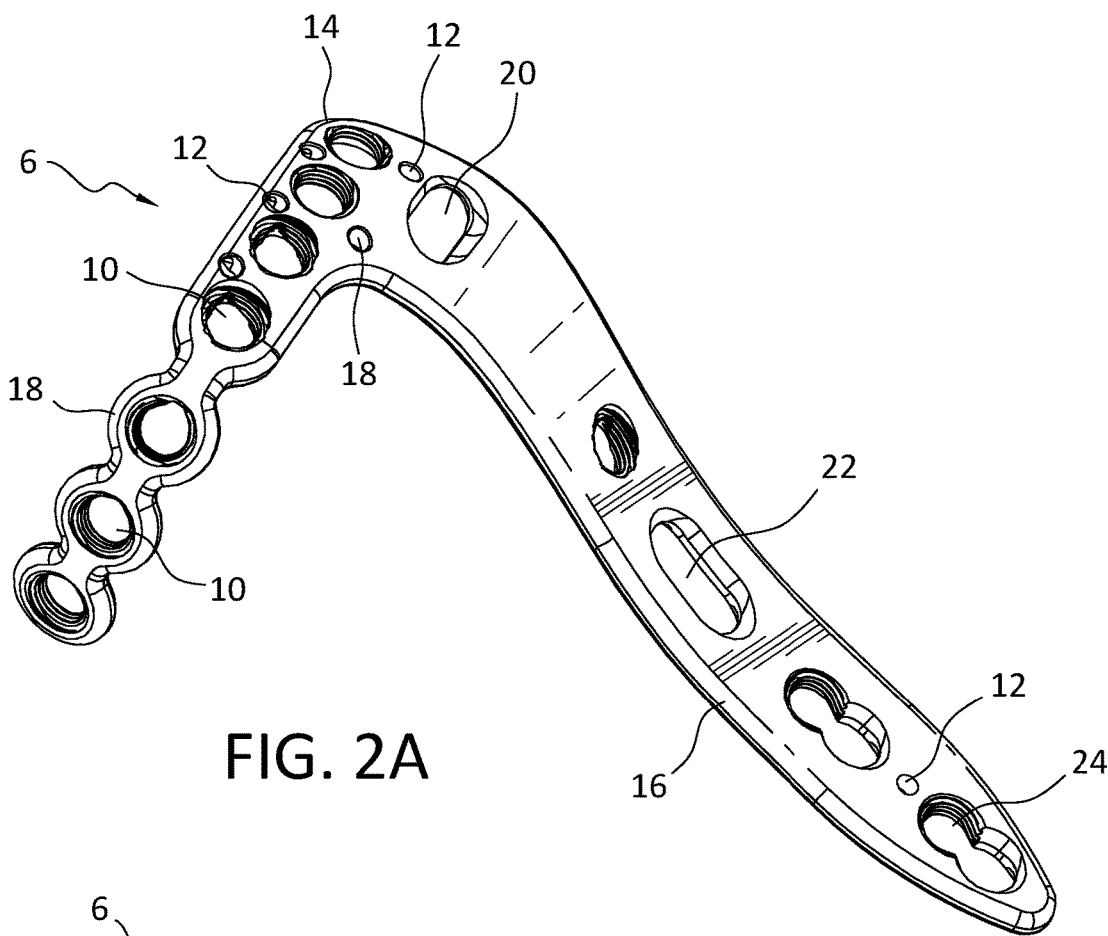
FIGS. 2A-2F illustrate perspective, top, first side, second side, bottom, and end views of the tibia plate.
Figure 2B:
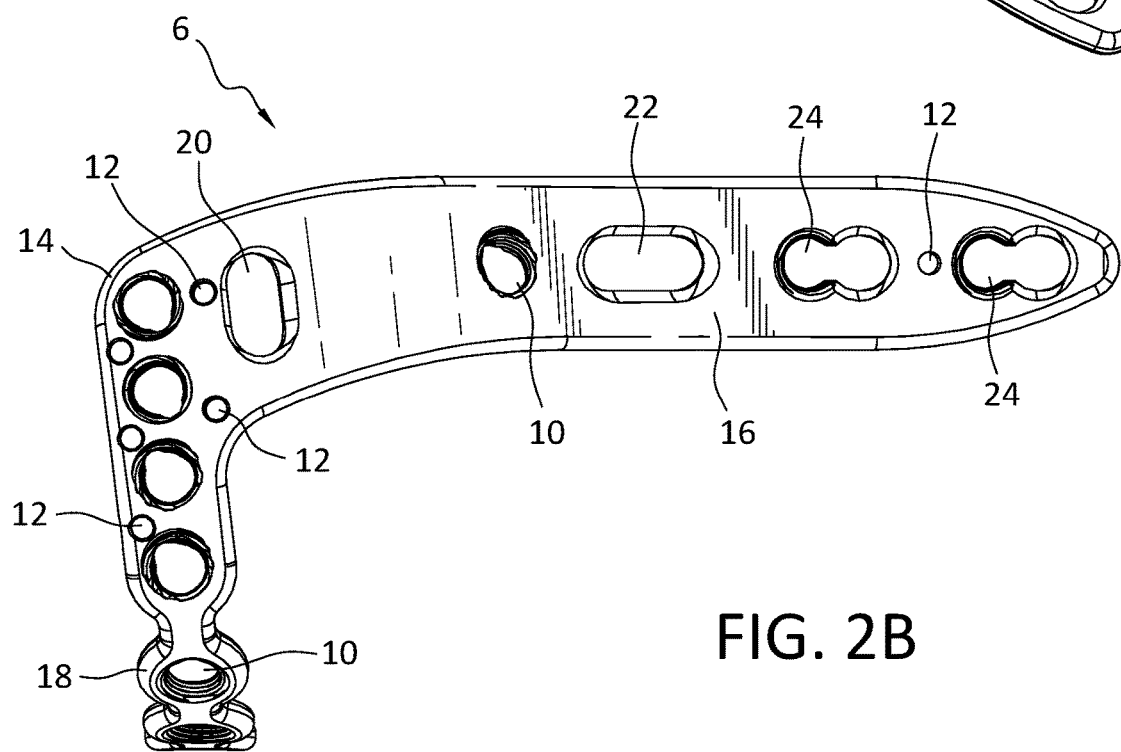
Figure 2C:
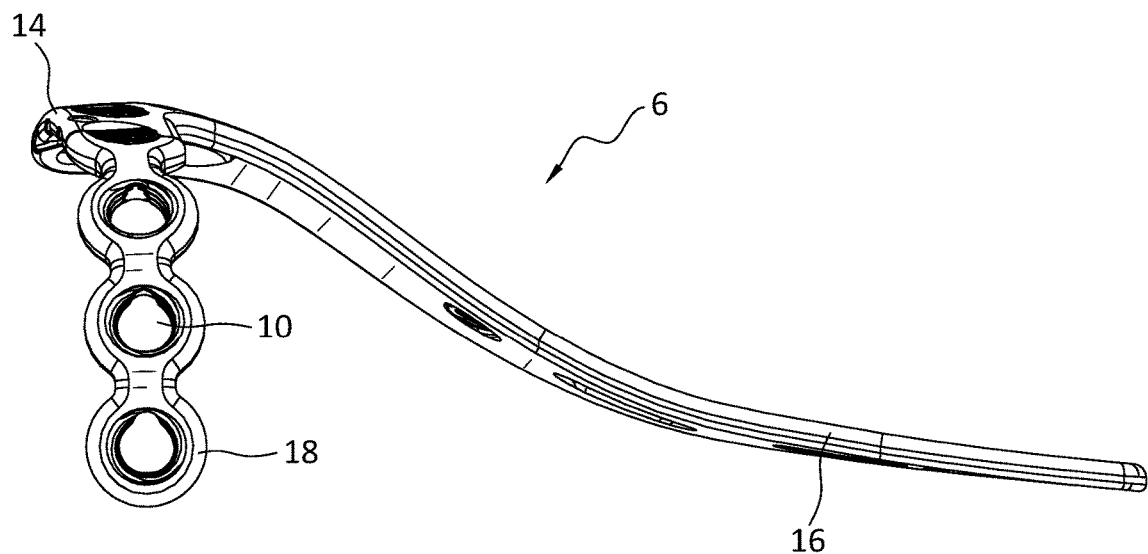
Figure 2D:
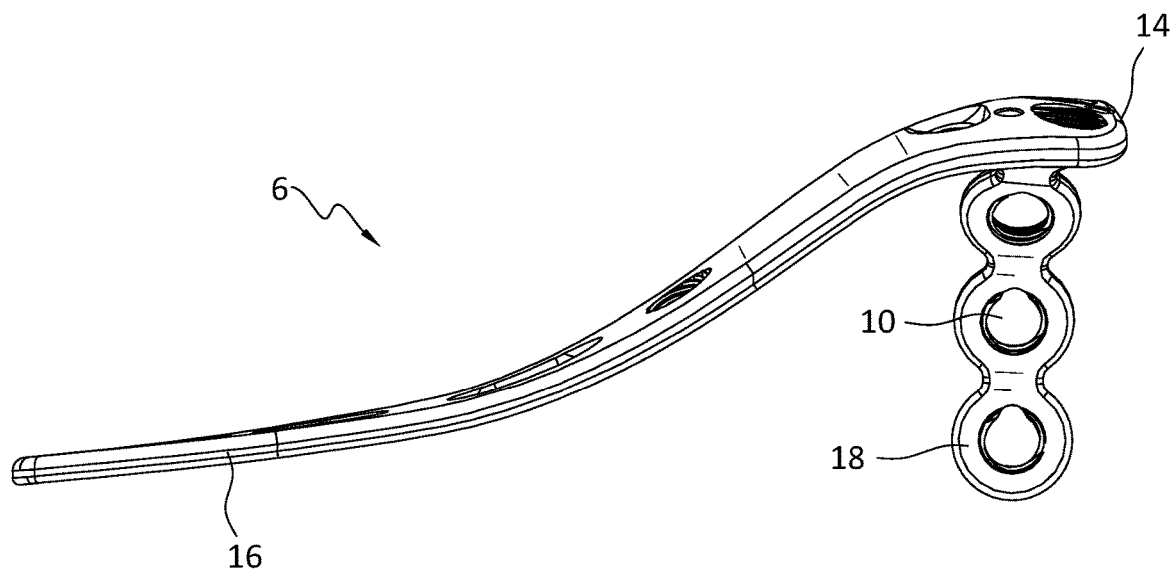
Figure 2E:
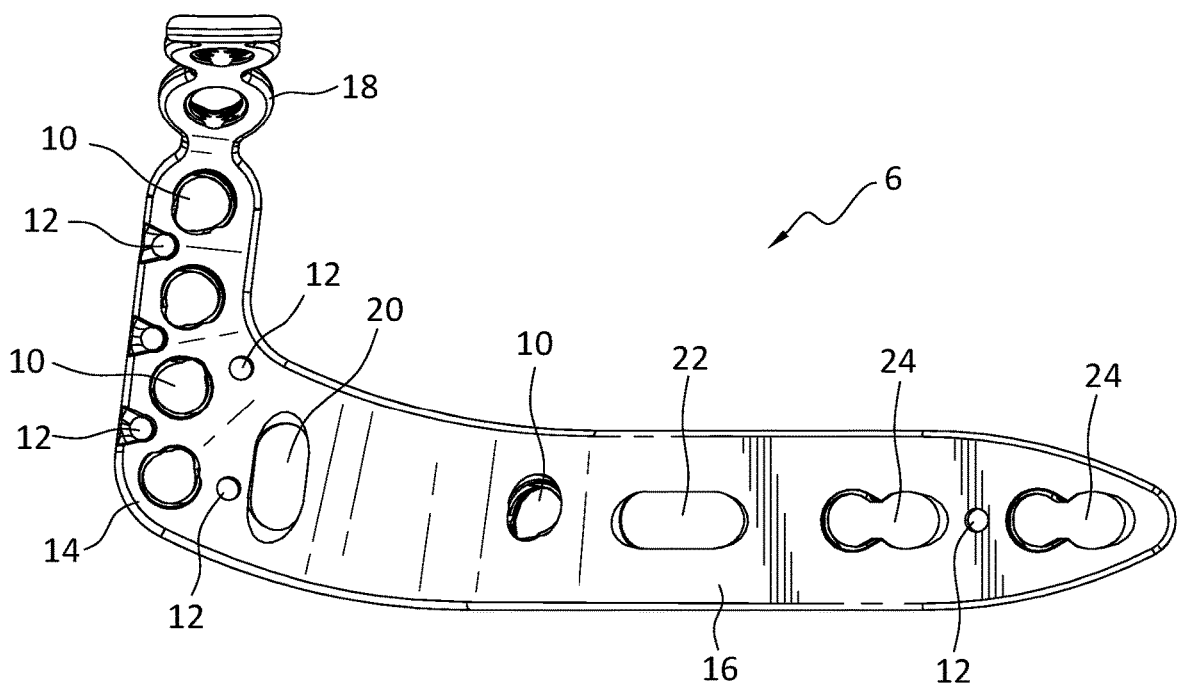
Figure 2F:
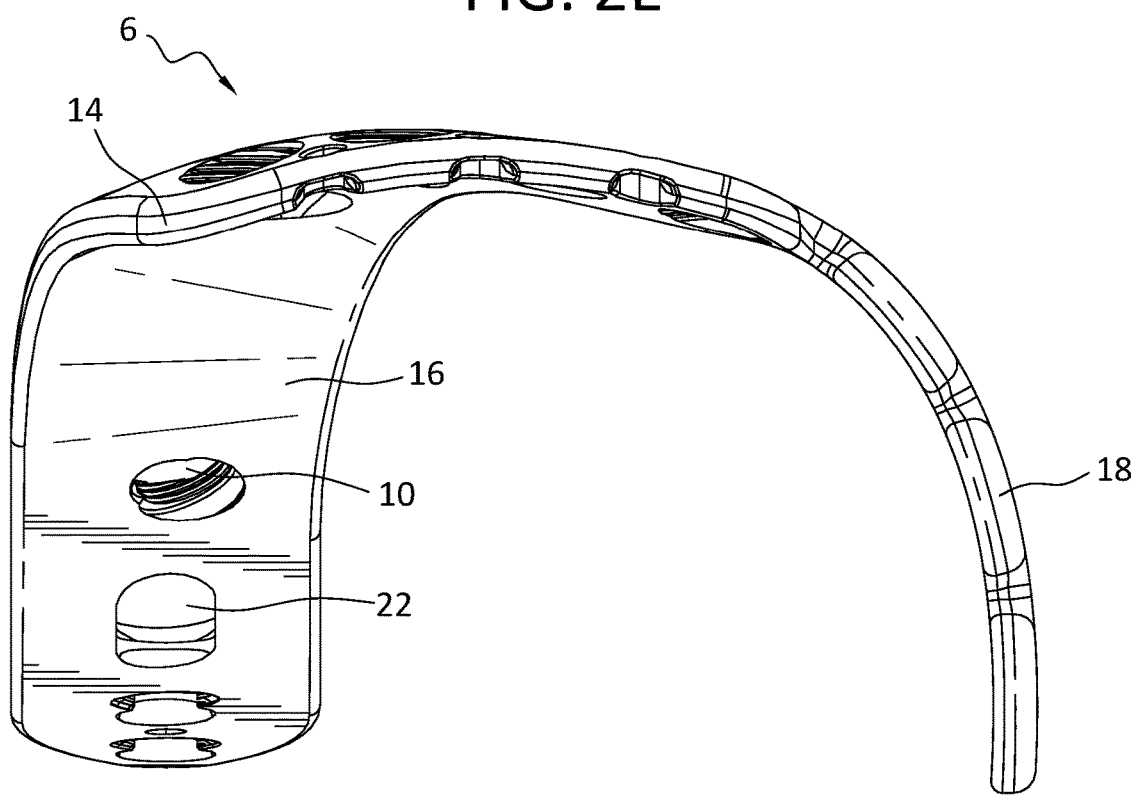
Figure 3A:
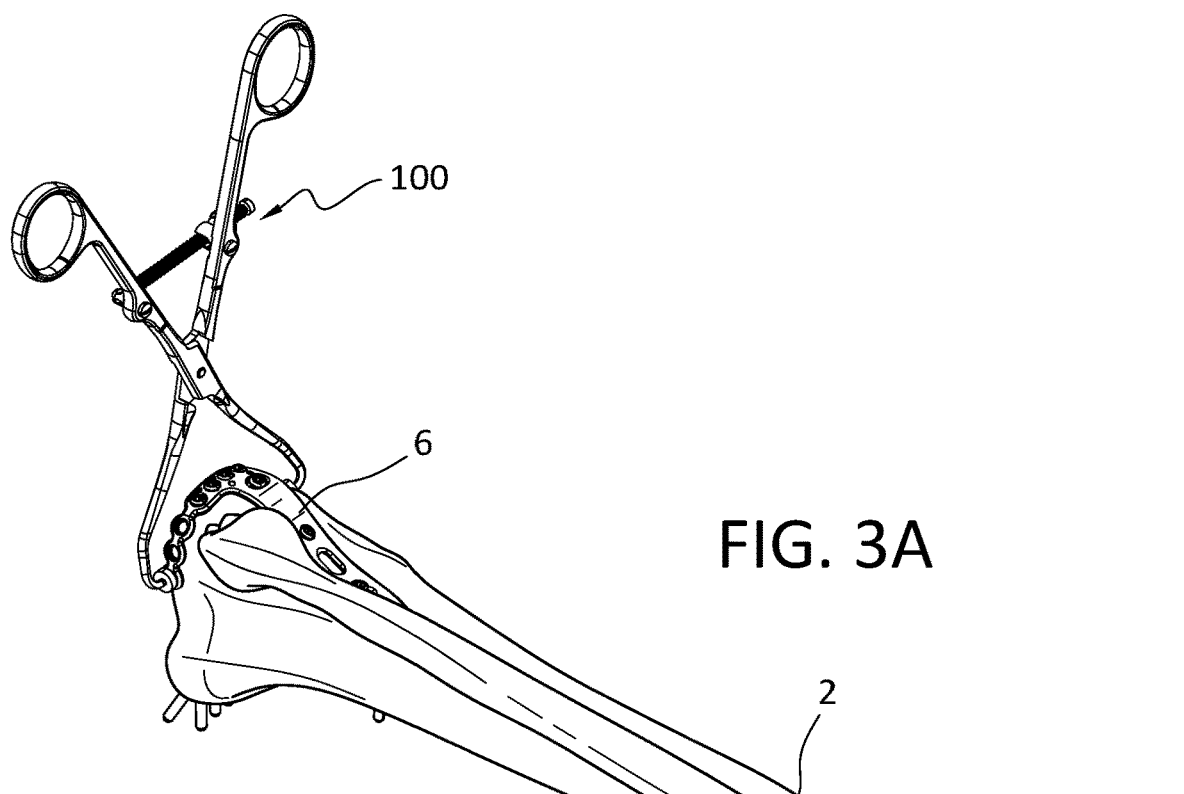
FIGS. 3A-3D illustrate a perspective, close-up perspective, end, and side view of the clamping tool applied to the tibia plate on the tibia.
Figure 3B:
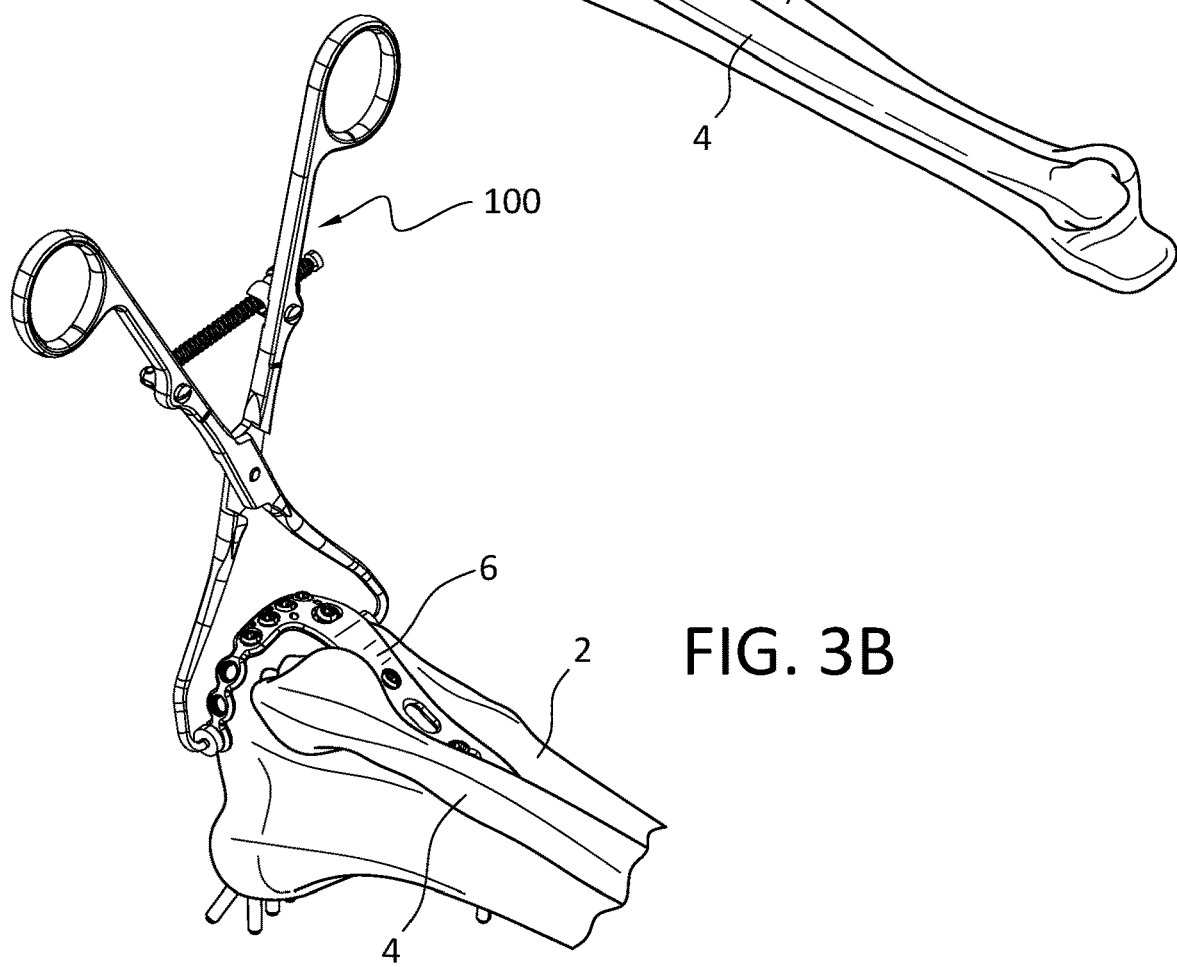
Figures 3C, 3D:
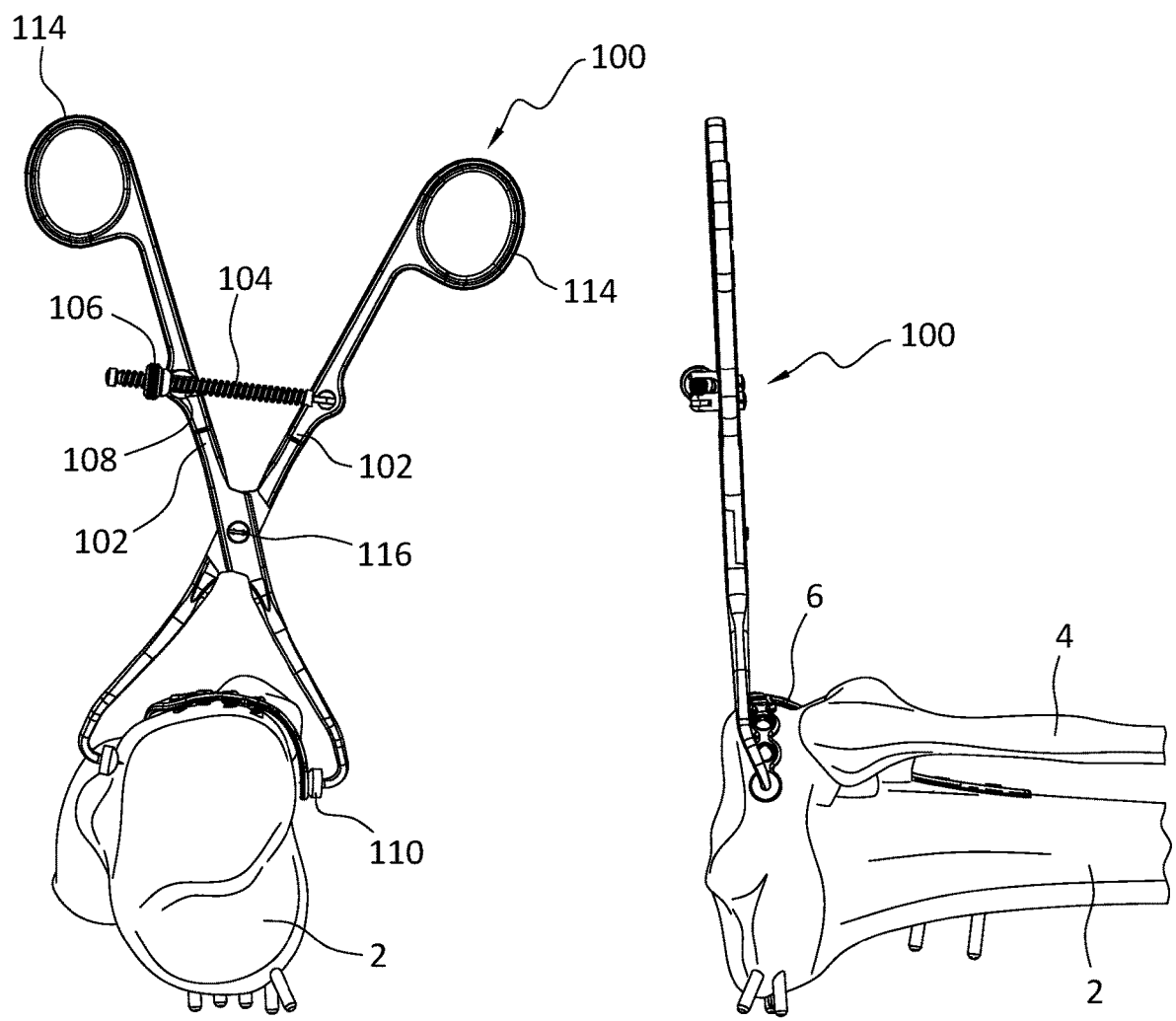

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of tibia plate systems will now be presented with reference to various apparatuses and techniques. Treatment of fractures in the posterolateral corner of the proximal tibia is challenging due to surrounding soft tissues such as arteries and nerves making it difficult to approach such fractures. However, the incidences of these fractures are continuously increasing, resulting, for example, from increasing numbers of scooter accidents where the distal femoral component of the flexed knee impacts into the posterior portion of the proximal tibia. Experienced surgeons may use other plates, e.g., with generic t-plates or oblique t-plates that may be applied as direct posterior buttress on the fracture fragment when patients are treated in the prone position. However, those fractures often come together with other proximal tibia fractures including bicondylar and complex fractures where treatment of all fractures in a supine position is preferred and provides easier access.

The new tibia plate disclosed herein is a lateral proximal tibia plate with a posterolateral extension arm. The plate is intended to be positioned close to the articular rim to be able to insert screws close underneath the articulating surface for the required support. The extension arm is an extension of the most proximal screw hole row to the posterior corner including, for example, 3-4 additional screw holes. The shape of the extension arm allows for adaptability of the extension arm to account for variability in tibia morphology among subjects, either by its outer shape, material, and/or thickness. The tibia plate disclosed herein is intended to be a flexible and adaptable buttress plate which provides a valuable addition/improvement in patient care for complex proximal tibia fractures.

FIGS. 1A-D illustrate perspective, close-up perspective, top, and side views of a tibia plate on the tibia. FIGS. 1A-1D show the tibia 2 and the fibula 4 with the tibia plate 6 attached to the tibia 2. The tibia plate 6 includes an extension arm 18 that extends from a head 14. The extension arm 18 wraps around a posterior corner to engage the posterior of the tibia. The extension arm 18 may run along the articular rim near the articulating surface of the tibia 2.

FIGS. 2A-2F illustrate perspective, top, first side, second side, bottom, and end views of the tibia plate 6. The tibia plate 6 has a body 16 and a head 14. As illustrated the tibia plate 6 is generally L-shaped but may have a head 14 that extends beyond both sides of the body 16 resulting in a T-shape. The extension arm 18 extends from the head 14 and curves back towards the head 14 of the tibia plate 6.

The extension arm 18 may have one or more plate screw holes 10. The plate screw holes 10 may be various types of screw holes, i.e., non-threaded, threaded, variable angle, locking, etc. The plate screw holes 10 in the extension arm 18 are illustrated in FIGS. 2A-F as being threaded.

The head 14 of the tibia plate 6 extends along the articular rim of the tibia 2 near the articular surface of the tibia 2. The head 14 is shown as having four plate screw holes 10, but the head 14 may include fewer or more plate screw holes 10. As described above, the plate screw holes 10 may be various types of screw holes, i.e., non-threaded, threaded, variable angle, locking, etc.

The head 14 may also include a plurality of plate guide holes 12. The plate guide hole 12 may be used to guide the placement of K-wires in the tibia 2. This may be done, for example, during the initial placement of the tibia plate 6. Further, the plate guide holes 12 may be used as suture holes.

The body 16 generally extends away from the head 14 and along the length of the tibia 2. The body 16 may include a variety of different types of holes. A plate guide hole 12 may be included near the tip of the body 16 away from the head 14. This may be used to help with securing the tibia plate 6 during initial placement. The body 16 may include any number (including none) of plate screw holes 10. Further, the body 16 may include combination screw holes 24. The combination screw hole 24 accepts both standard screws and locking screws. The number and location of the combination screw holes 24 may vary depending upon the specific clinical needs to be addressed. The combination screw hole 24 provides the flexibility of being able to use either a standard screw or a threaded screw to secure the tibia plate 6 to the tibia 2. The body 16 may include a longitudinal elongated hole 22 that is hole that is elongated along the length of the body 16 and hence along the length of the tibia 2. This longitudinal elongated hole 22 allows for some flexibility and adjustment in fixing the tibia plate 6 to the tibia 2. A plate screw 8 may be placed in longitudinal elongated hole 22 but not completely tightened. This may help to initially secure the tibia plate 6 to the tibia 2. Because the plate screw 8 is not completely tightened, the tibia plate 6 may be moved along the longitudinal elongated hole 22 to allow for adjustment in the positioning of the tibia plate 6 on the tibia 2. When the tibia plate 6 is in its final position, the plate screw 8 in the longitudinal elongated hole 22 may be tightened to help fix and secure the tibia plate 6.

The body 16 also includes a lateral elongated hole 20. The lateral elongated hole 20 is a hole that is elongated across the width of the body 16, therefore it is elongated laterally. This lateral elongated hole 20 may be used during surgery to generate the required posterior-to-anterior compression of the posterolateral fragment to the tibia after a cortex screw has already previously been placed in the lateral elongated hole 20 during preliminary plate positioning. Accordingly, the tibia plate 6 may slide anteriorly below the cortex screw. A reduction force may be applied to the tibia to reduce fractures after a plate screw 8 has been placed in lateral elongated hole 20. Such reduction may be carried out using various known techniques. One way to reduce the fracture is by using a clamping tool 100 that will be further described below. Once the facture(s) is reduced and compressed then additional screws may be placed in other plate screw holes 10 in the head 14 to secure the reduced fracture(s). Once the facture(s) are reduced the plate screw hole 10 in the lateral elongated hole 20 may be tightened.

FIGS. 3A-3D illustrate a perspective, close-up perspective, end, and side view of the clamping tool applied to the tibia plate on the tibia. The clamping tool 100 may be applied to engage one of the plate screw holes 10 in the extension arm 18 and the tibia 2 opposite the extension arm 18 in order to apply a reduction force on the tibia fracture. Further, the clamping tool 100 may bend the extension arm 18 in order to conform with the articular rim of the tibia 2.

Figure 4B:
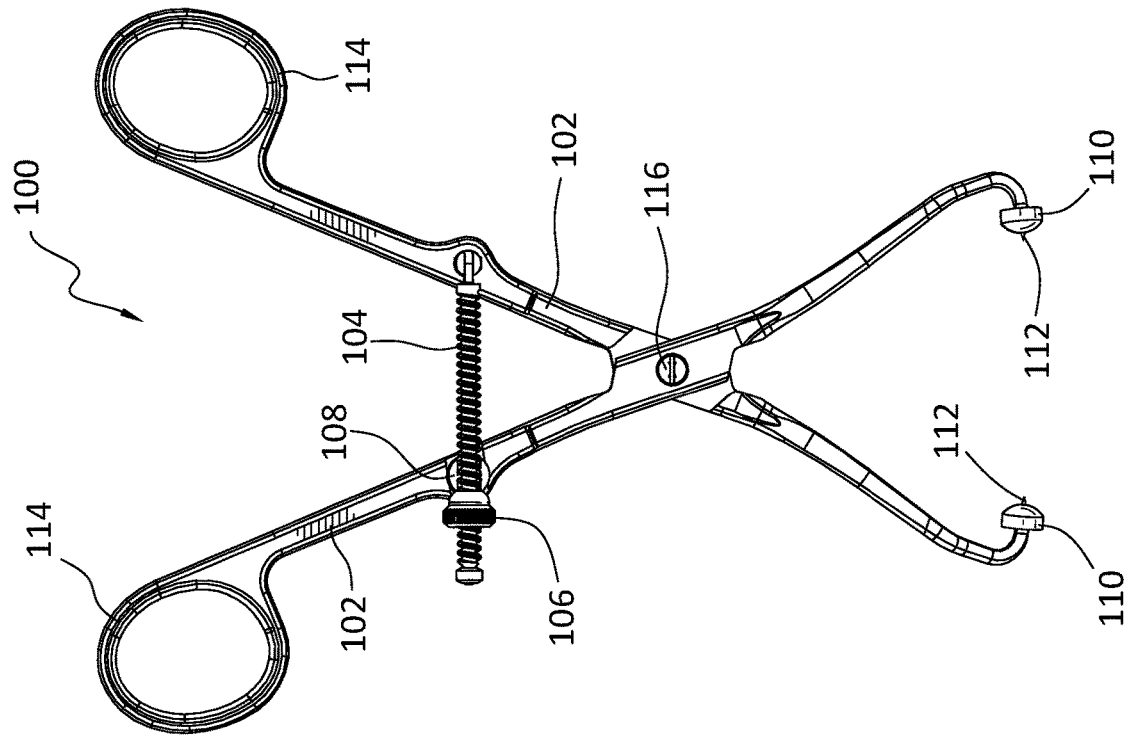
FIGS. 4A and B illustrates a perspective view and a side view of the clamping tool.
Figure 4A:
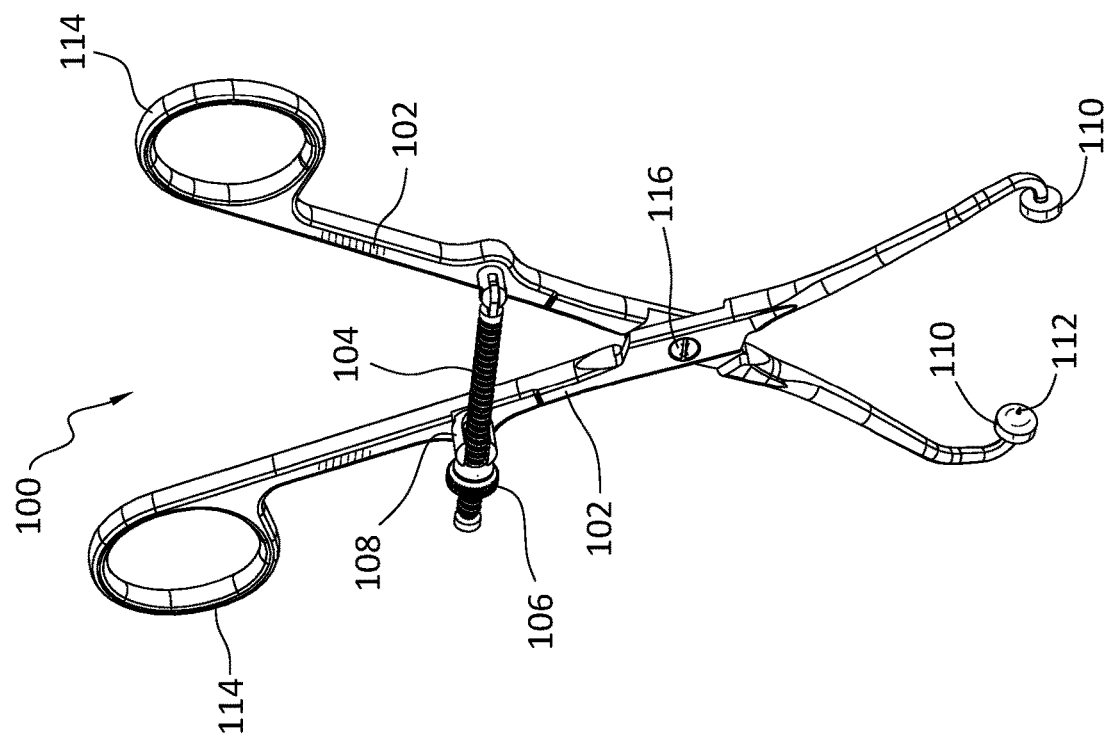

FIGS. 4A and B illustrates a perspective view and a side view of the clamping tool 100. The clamping tool 100 includes two arms 102 connected at a pivot fastener 116 that allows the arms 102 to pivot. One arm 102 includes a slotted protrusion 108 that has a slot that receives a screw 104. An end of the screw 104 is connected to the other arm 102. A nut 106 is on the screw 104 and may be tightened to engage the slotted protrusion 108 to keep the clamping tool 100 clamped to the tibia 2. The extension head 104, extension body 106, and interface surface 108 act as a locking mechanism to lock the clamping tool in a specific position. The screw 104 may swing out of the slotted protrusion 108 in order to release the clamping tool 100. The arm 102 may include handle 114 that allows the user to hold and apply the clamping tool 100.

The ends of the arm 102 bend back inwards towards one another and have a tip 112 that is sharp in order to engage the tibia 2. Further, the ends are shown as being symmetric, by they may also be asymmetric and also may have other shapes including multiple bends. Further, a ball interface 110 is at the end of the arms 102. The ball interface 110 is configured to engage the plate screw holes 10 in the extension arm 18 of the tibia plate 6. The ball shape of the ball interface 110 allows for the ball interface 110 to be easily placed in the plate screw hole 10 even when it is not visible. The tip 112 extends out of the ball interface 110 in order to grip the tibia 2. In use, one ball interface 110 on a first arm 102 will engage the plate screw hole 10 in the extension arm 18 and the tip 112 on the second arm 102 will engage the tibia 2 on the side opposite the extension arm 18. The surgeon may apply a reduction force to the fracture to reduce the fracture. Further, this force may bend the extension arm 18 in order to conform with the articular rim of the tibia 2.

A method of using the tibia plate 6 and the clamping tool 100 will now be described. First, the surgeon may make an incision to open up the tibia 2 for application of the tibia plate 6. A lateral "S" incision may be used when a simple articular fracture or extra-articular fracture is present. In the presence of a complex intra-articular fracture, an anterolateral incision is made using an anterolateral approach. Next, an arthrotomy is performed to expose the joint for reduction. If needed, the incision may be extended for adequate exposure of the joint for reduction and anatomic fixation. Regardless of the surgical incision used, care should be taken to minimize soft tissue stripping.

The next step includes reducing the articular surface of the tibia 2. Note that prior to reduction, application of an external fixator or distractor may facilitate reduction and visualization of the joint. The articular fracture fragments are reduced and the reduction is confirmed using image intensification and direct visualization when possible. After reduction, fragments may be provisionally fixed using independent K-wires. The independent K-wires may be placed flush with the lateral plateau cortex, thereby preventing conflict with plate insertion. Plate guide holes 12 are also provided on the tibia plate 6 to help maintain a provisional reduction and establish a provisional plate position.

Next, the surgeon determines a plate type to use to treat the fracture. It is noted that the fractured bone might be broadened and lead to the identification of the wrong plate type. In this case, x-ray images of the other limb may be useful for comparison and planning.

The tibia plate 6 and its extension arm 18 are next contoured as needed to fit the specific tibia 2 with the fracture. The tibia plate 6 with extension arm 18 is anatomically pre-contoured, but the extension arm 18 arm might require contouring to achieve some pre-load to the posterolateral bone fragment.

Then the surgeon inserts K-wires through the plate guide holes 12 in the plate head to preliminarily fix the tibia plate 6 to the tibia 2. Before proceeding, the surgeon confirms the placement of the tibia plate 6 through clinical examination and fluoroscopy and readjusts the tibia plate 6 position if necessary.

Next, the tibia plate 6 is preliminarily secured with a screw, such as a cortex screw, at the anterior side of the lateral elongated hole 20 in the neck of the tibia plate 6. Then a drill bit is inserted into a universal drill guide. In this example, the drill bit may be 2.5 mm, but other sizes may be used as well. The drill bit is then advanced until it reaches the desired depth. The drill bit and drill guide are next removed. At this point the surgeon uses a depth gauge to measure for the length of the plate screw 8 to use or read off of a calibrated drill bit. The surgeon then inserts the appropriate length plate screw 8 into the drilled hole. This may be for example a 3.5 mm cortex screw but other lengths and types of screws may be used as well.

Before final tightening, the surgeon applies compression between a plate screw hole 10 in the extension arm 18 (for example it may be the plate screw hole 10 at the end of the extension arm 18) and the anterior surface of the tibia 2 using the clamping tool 100. The inserted plate screw 8 is then tightened to maintain compression.

After the compression with the clamping tool 100 is applied to a posterolateral bone fragment this has to be maintained with the screw plate fixation system. One way to accomplish this is to insert a cortex screw in the first hole in the extension arm with a trajectory from posterolateral to anteromedial. This will push the extension arm towards the fragment. This cortex screw may be angulated towards distally such that its trajectory does not collide with the rafting screws from lateral which sit below the articular surface.

For final tightening, the screwdriver shaft may be assembled with a handle to tighten the screw manually. Prior to proceeding, clinical examination and fluoroscopy is used to confirm that: the plate is orientated properly on the tibial plateau; the plate screw 8 trajectory in the proximal plate screw hole 10 are parallel to the joint in the transverse plane (this may vary slightly based on individual anatomy and any bending that occurs in the tibia plate 6 during plate screw 8 tightening); and the alignment of the plate to the shaft of the tibia is correct in both the anterior-posterior (AP) and lateral views.

The K-wires inserted for preliminary fixation may be removed. It is noted that the proper tibia plate 6 position is key to successful treatment of the tibia fracture. A tibia plate 6 positioned too distally does not provide adequate rafting support of the articular surface, and a plate positioned too proximally may damage the joint area with the proximal screws. To avoid screw collision of the plate screws 8 in the extension arm 18 and in the plate screw holes 8 in the head (i.e., the plate screw holes 10 at the end of the head 14 of the tibia plate 6), a long drill guide may be inserted to check the trajectory.

Finally, plate screws 8 are inserted in the plate screw holes 10 in the proximal rafting row (i.e., the plate screw holes 10 at the end of the head 14 of the tibia plate 6.) These screws may be 3.5 mm variable angle locking screws, but other screw sizes and types may be used as well. Then plate screw hole 10 are placed in the shaft of the tibia plate 6. These screws may be 3.5 mm cortex screws, but other sizes and types of screws may be used as well.

Optionally an incision may be made to open an additional posterolateral approach window to place screws in the holes at the end of the extension arm.

The tibia plate 6 is intended to be a flexible and adaptable buttress plate which provides a valuable addition/improvement in patient care for complex proximal tibia fractures.

The foregoing disclosure provides illustration and description but is not intended to be exhaustive or to limit the aspects to the precise form disclosed. Modifications and variations may be made in light of the above disclosure or may be acquired from practice of the aspects.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A tibia plate for treating an articular fracture of a tibia, comprising:
   a head with a plurality of screw holes and guide holes wherein the head is configured to extend along an articular rim of the tibia;
   a body with a proximal end attached to the head configured to extend to a distal end along a length of the tibia, including:
      a plurality of screw holes;
      a plurality of guide holes; and
      a lateral elongated hole that is elongated along a width of the body and that overlaps a straight line extending between one of the plurality of screw holes of the head and the distal end of the body; and
   an extension arm including a screw hole configured to extend along the articular rim of the tibia and to engage a posterior of the tibia;
   wherein the tibia plate is formed as a single component.

2. The tibia plate of claim 1, wherein the body includes a longitudinal elongated hole that is elongated along a length of the body.

3. A tibia plate system for treating an articular fracture of a tibia, comprising:
   the tibia plate according to claim 1; and a clamping tool configured to engage the screw hole in the extension arm and an anterior surface of the tibia comprising:
  first and second arm connected at a pivot point;
  a locking mechanism configured to lock the first and second arms in a specific position;
  ball interfaces at an end of the first and second arms configured to engage the screw hole in the extension arm; and
  tips that are sharp extending from the ball interfaces configured to engage the anterior surface of the tibia.

4. The tibia plate system of claim 3, wherein the body of the tibia plate includes a longitudinal elongated hole that is elongated along a length of the body.

5. A method for treating an articular fracture of a tibia using a tibia plate according to claim 1, comprising:
  making an incision to expose the tibia;
  reducing the articular fracture of the tibia;
  preliminarily fixing the tibia plate to the tibia;
  placing a screw partially into the tibia through the lateral elongated hole in the tibia plate;
  applying compression between the screw hole in the extension arm and an anterior surface of the tibia; and
  placing additional plate screws in the tibia through additional screw holes in the tibia plate.

6. The method of claim 5, further comprising:
  contouring the tibia plate to fit the tibia.

7. The method of claim 5, wherein the incision is a lateral S incision.

8. The method of claim 5, wherein the incision is an anterolateral incision using an anterolateral approach.

9. The method of claim 5, further comprising:
  making another incision to open a posterolateral approach window; and
  placing an additional screw in a hole near an end of the extension arm.

10. The method of claim 5, further comprising:
  performing an arthrotomy to expose a joint before reducing the articular fracture.

11. The method of claim 5, further comprising applying one of an external fixator or distractor to facilitate reduction and visualization of a joint.

12. The method of claim 5, provisionally fixing reduced bone fragment with a K-wire placed through guide holes in the tibia plate.

13. The method of claim 5, further comprising determining a plate type of the tibia plate before contouring the tibia plate.

14. The method of claim 5, wherein contouring the tibia plate to fit the tibia includes providing pre-loading to a posterolateral bone fragment.

15. The method of claim 5, wherein preliminarily fixing the tibia plate includes inserting a plurality of K-wires though a plurality of guide holes in the tibia plate.

16. The method of claim 5, further comprising confirming the preliminary fixation of the tibia plate using one of clinical examination and fluoroscopy.

17. The method of claim 5, further comprising tightening the screw partially placed into the tibia through the lateral elongated hole in the tibia plate after applying compression.

18. The method of claim 5, further comprising carrying out a clinical examination and fluoroscopy examination prior to placing additional plate screws in the tibia to confirm that: the tibia plate is orientated properly on a tibial plateau; plate trajectories in proximal plate screw holes are parallel to a joint in a transverse plane; and an alignment of the tibia plate to a shaft of the tibia is correct in both anterior-posterior and lateral views.

19. The method of claim 18, wherein applying compression between the screw hole in the extension arm and an anterior surface of the tibia is carried by using a clamping tool.

20. The method of claim 19, wherein the clamping tool comprises:
  first and second arm connected at a pivot point;
  a locking mechanism configured to lock the first and second arms in a specific position;
  ball interfaces at an end of the first and second arms configured to engage the screw hole in the extension arm; and
  tips that are sharp extending from the ball interfaces configured to engage the anterior surface of the tibia.

* * * * *